(12) United States Patent
Gentry

(10) Patent No.: US 9,881,506 B1
(45) Date of Patent: Jan. 30, 2018

(54) UNMANNED AERIAL VEHICLE BEACON POD

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 14/656,537

(22) Filed: Mar. 12, 2015

(51) Int. Cl.
| | |
|---|---|
| *G08G 5/00* | (2006.01) |
| *G08G 5/02* | (2006.01) |
| *G05D 1/00* | (2006.01) |
| *H04L 29/08* | (2006.01) |
| *H04W 76/02* | (2009.01) |
| *H04W 12/06* | (2009.01) |

(52) U.S. Cl.
CPC ......... *G08G 5/0069* (2013.01); *G08G 5/0013* (2013.01); *G08G 5/025* (2013.01); *H04L 67/12* (2013.01); *H04L 67/141* (2013.01); *H04W 12/06* (2013.01); *H04W 76/02* (2013.01)

(58) Field of Classification Search
CPC ........ G05D 1/00; G08G 5/025; G08G 5/0013; H04L 67/12; H04L 67/141; H04W 12/06; H04W 76/02; B64D 1/08
USPC ................................ 701/3, 2, 16; 244/114 R
See application file for complete search history.

(56) References Cited

U.S. PATENT DOCUMENTS

| | | | | |
|---|---|---|---|---|
| 2015/0175276 A1* | 6/2015 | Koster | ...................... | B64F 1/32 244/114 R |
| 2015/0301150 A1* | 10/2015 | Stuckman | ................. | G01S 1/00 342/407 |
| 2016/0001884 A1* | 1/2016 | Fleck | ................... | G05D 1/0011 701/2 |
| 2016/0068264 A1* | 3/2016 | Ganesh | ................ | G08G 5/0069 701/2 |
| 2016/0068265 A1* | 3/2016 | Hoareau | ................ | G05D 1/102 701/3 |
| 2016/0196753 A1* | 7/2016 | Jarrell | .................. | G08G 5/0069 701/16 |
| 2016/0236778 A1* | 8/2016 | Takayama | ................ | B64D 1/12 |

* cited by examiner

Primary Examiner — Tan Q Nguyen
(74) Attorney, Agent, or Firm — Lee & Hayes, PLLC

(57) ABSTRACT

Beacon pods that provide location information to unmanned aerial vehicles (UAVs). The beacon pods may emit location information, which may replicate global positioning system (GPS) satellite information, provide a homing signal, provide access to a mobile telephone network as a signal repeater or booster, and/or provide other information and/or connectivity to a UAV, which may aid navigation and/or other operations of UAVs. The beacon pods may be configured for use in a residential location, which may enable a beacon pod to connect to residential power and computing networks. The beacon pods may establish secure data communication with UAVs and may log events related to UAVs, which may be used for various purposes.

20 Claims, 8 Drawing Sheets

UNMANNED AERIAL VEHICLE BEACON POD

BACKGROUND

Unmanned aerial vehicles (UAVs) vary in degrees of sophistication. For example, UAVs used by hobbyists often rely completely on receipt of control signals from a user-operated remote control device. Thus, these UAVs rely on a user to provide all navigational instructions. More advanced UAVs may determine some navigational instructions without direct input. These UAVs may receive high level instructions (such as waypoints, a destination, and/or other parameters), and may implement logic to navigate through airspace based on the high level instructions and other information accessed by sensors on the UAVs. For example, some UAVs may access global positioning satellite (GPS) systems to access current location information while some UAVs may communicate with a command station using a mobile telephone network to exchange information, log progress, and for other reasons.

Many regions of land and portions of airspace do not have reliable access to GPS signals and/or to mobile telephone networks. For example, some remote rural areas, some wilderness areas, and some areas that frequently experience inclement weather, such as heavy precipitation, may not have reliable access to GPS signals and/or reliable access to mobile telephone networks. This may pose navigational problems for UAVs that enter these regions of land and portions of airspace when the UAVs rely on GPS or mobile telephone networks for at least some navigation or control instructions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
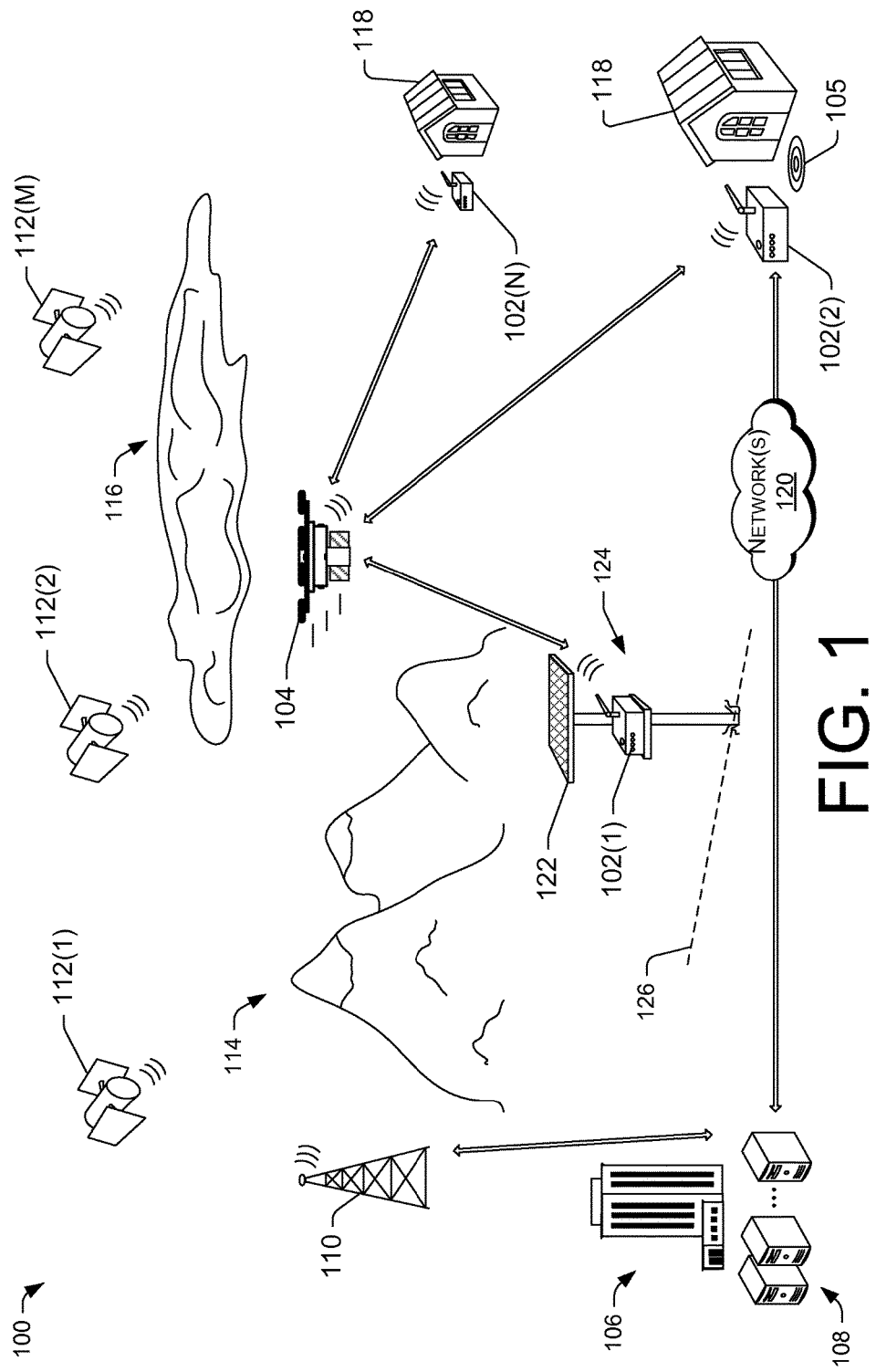
FIG. 1 is a schematic diagram of an illustrative environment that includes unmanned aerial vehicle (UAV) beacon pods to provide UAVs with at least navigational information.

This disclosure is directed at least partly to beacon pods that provide location information to unmanned aerial vehicles (UAVs). The beacon pods may emit location information, which may replicate global positioning system (GPS) satellite information, provide a homing signal, provide access to a mobile telephone network or other communication link using a communication signal repeater or booster, and/or provide other information and/or connectivity to a UAV, which may aid navigation and/or other operations of UAVs. The UAVs may be used for delivering packages to locations near the beacon pods, among many other possible uses for the UAVs.

The beacon pod may be implemented as a consumer electronic device that includes one or more transceivers, network connections, and logic to enable communication with UAVs within a predetermined range from the beacon pod. As used herein (in the specification and claims), the term "transceiver" shall be construed to mean "a transmitter and a receiver" for purposes of communication. Therefore, as used herein, absent specific language to the contrary, the term transceiver shall be construed to include assemblies where transmission and reception are performed by a single device, as well as assemblies where distinct devices or sub-assemblies perform the transmission and reception tasks. The beacon pod may receive electrical power from a standard alternating current (AC) power supply common in residential houses. In some embodiments, the beacon pod may include a battery and/or renewable energy devices, such as solar cells or turbines, which may harness light or movement of air or water to harness electrical power. The beacon may be connected to a data network (or computer network), such as the Internet, a wide area network (WAN), a macro network, and/or other wired or wireless networks. In various embodiments, the beacon pod may self-determine its location, such as by receiving GPS signals when communication with GPS satellites or other GPS devices is made available. Thus, the beacon pod may store its location as well as a unique identifier that uniquely identifies the beacon pod and possibly indicates other information, such as a type or classification of a location or an environment where the beacon pod operates (e.g., in a residential location, in an office building, in a wildlife preserve, in a mountainous region, etc.)

In some embodiments, the beacon pod may be used to provide waypoint data and/or other location information to UAVs. For example, the beacon pod may supplement GPS data provided by satellites, which may enable UAVs to operate in areas that have little or poor coverage by GPS satellites, such as areas with dense coverage, inclement weather, and/or other features that make GPS reception from satellites difficult or unreliable. The beacon pod may emit location information for use by the UAVs. For example, the beacon pod may emit, at intervals, synthetic GPS signals that include a location of the beacon pod and a current time, thus replicating information provided by GPS satellites. The synthetic GPS signals may improve an accuracy of a determined location by recipient devices (e.g., UAVs) due to signal strength, minimized clock drift, more accurate beacon pod location information, and/or for other reasons. As used herein, the use of the term "synthetic" indicates that the GPS signals do not originate from a GPS satellite.

In various embodiments, the beacon pod may operate as a homing device to provide location information to a UAV. For example, the beacon pod may transmit a dipole flux pattern to enable a UAV to locate the beacon pod and travel toward the beacon pod. The beacon pod may include an identifier that may indicate a type or classification of the location. For example, the beacon pod may mark a specific location to drop a package or an obstacle for the UAV to avoid (e.g., a tower, a mountain, a cliff, etc.). The beacon pod may include information indicating a physical address, such as a delivery address or designation, which may be provided to the UAV, possibly as encrypted data.

In accordance with one or more embodiments, the beacon pod may operate to create or repeat communication network signals, such as mobile telephone network signals or other communication link signals. For example, the beacon may boost an existing communication signal or may create a communication signal through information received from a wired or wireless network (e.g., an Internet connection, a WAN connection, etc.). The beacon pod may provide access to the communication signals after authenticating a UAV. For example, the beacon pod may encrypt data and/or initiate transmission of data after authentication of a UAV. The UAV may communicate with a command station through data transmission facilitated by the beacon pod when the UAV does not have communication access through other means, such as through traditional mobile telephone network antennas located in a nearby environment.

The beacon pods may be deployed to locations that may have restricted or unreliable access to GPS and/or communication signals. In some embodiments, hosts of the beacon pods, such as users that connect the beacon pods to available infrastructure (e.g., power, networks, etc.), may benefit from use of the beacon pods by gaining better service from the UAVs, improved reception to a communication signals/sources, and/or by receiving other rewards and/or discounts (e.g., cheaper delivery of items, etc.). The beacon pods may log interactions with the UAVs for various purposes, and may report at least some interaction data to other devices, such as a command station. This data may be used for tracking UAVs, among other possible uses.

The techniques, apparatuses, and systems described herein may be implemented in a number of ways. Example implementations are provided below with reference to the following figures.

FIG. 1 is a schematic diagram of an illustrative environment 100 that includes unmanned aerial vehicle (UAV) beacon pods 102 configured to provide UAVs with at least navigational information. The beacon pods 102 may transmit signals for receipt by a UAV 104 (or by multiple UAVs) to provide the UAV 104 with navigational information, communication data, and/or other relevant information. For example, the beacon pods 102 may provide synthetic GPS data, which may mimic GPS data provided by satellites (e.g., providing time and location coordinates at given intervals). The beacon pods may act as a homing device to enable the UAV 104 to locate a designated delivery location 105, avoid a dangerous obstacle, determine bounds of usable airspace, and/or determine other important markers or locations. The beacon pods may repeat and/or boost mobile telephone network signals or other communication signals (e.g., Wi-Fi, etc.) to enable communication by the UAV 104 with other entities, including a command station 106. The command station 106 may include computing devices 108 that coordinate at least some activities of the UAV 104 and/or exchange data with the UAV 104 for other purposes. For example, the command station 106 may direct the UAV to travel to a particular location and perform one or more particular tasks, such as deliver a package to a specific location. However, the command station 106 may not control every action of the UAV during flight, but may instead rely on at least some level of autonomous flight.

The environment 100 may include various devices that provide information to the UAV depending on a current location of the UAV and other factors, such as weather, time of day, and so forth. An antenna 110 may provide communication signals to the UAV 104, which may enable the UAV 104 to exchange data with the command station 106. However, when the UAV 104 is out of range from the antenna 110 and other similar antennas, the UAV 104 may communicate with the command station 106 through one or more of the beacon pods 102 that are near the UAV 104 and configured to enable data transmission with the UAV 104. For example, a beacon pod 102(2) may operate as a communication signal repeater/booster and enable the UAV 104 to transmit data to the command station 106 using a similar communication that would otherwise be used to exchange data via the antenna 110. As another example, the beacon pod 102(N) may enable the UAV 104 to gain access to the command station 106 via a Wi-Fi connection being broadcast, and possibly repeated or boosted, by the beacon pod 102(N).

Typically, the UAV 104 may navigate primarily by way of GPS location data provided by satellites 112, such as satellites 112(1), 112(2), and 112(M). However, in some instances the UAV 104 may be unable to receive GPS signals from three or more satellites, such as when communications are blocked by structures 114 (e.g., mountains, high rise buildings, bridges, and/or other structures or natural objects), by weather phenomenon 116 (e.g., clouds, storms, precipitation, etc.), and/or by operational failure of existing infrastructure (e.g., a broken satellite, power failure at antenna, etc.). In such instances, the UAV 104 may maintain navigational information and/or data communications through interaction with one or more of the beacon pods. In some embodiments, the UAV 104 may triangulate a location based on information received from three or more of the beacon pods 102, thus enable location determination without receiving GPS signals from satellites. For example, as shown in FIG. 1, the UAV 104 may lose communication with the satellites 112(2) and 112(M) due to the weather phenomenon 116 (e.g., clouds) and may lose communication with the antenna 110 due to distance and/or structures 114 (e.g., mountains). In some instances, the location signals from the beacon pods may enable the UAV 104 to more precisely determine a location of the UAV. For example, the beacon pods may minimize clock drift, include more precise self-location information, and/or provide stronger signals to the UAV to enable improved location determination by the UAV 104.

At least some of the beacon pods 102 may be used in buildings 118, such as residential homes, office buildings, and/or other structures that typically have access to electrical power and a computer network 120. The beacon pods 102 may connect to AC power and may connect to the computer network using a wired or wireless connection. However, some beacon pods may not connect to a computer network. The computer network 120 may facilitate communication with the command station 106.

Some beacon pods, such as the beacon pod 102(1) may be used outside of a building. The beacon pod 102(1) may be configured with a renewable power source 122, such as a solar cell array to provide power to the beacon pod. The beacon pod may be supported by a stand 124, which secures the beacon pod 102(1) and the renewable power source 122, among other functions. In some embodiments, beacon pods 102 may function autonomously or partially autonomously once the beacon obtains power from a power source (e.g., AC power, solar power, wind power, water turbine power, etc.). For example, the beacon pod, once powered on, may determine its one location based on access to communications from GPS satellites (when available) and/or from communications with nearby beacon pods. For example, in an area that does not have reliable or any communications with GPS satellites, the beacon pods 102 may self-locate by accessing data from other beacon pods that have self-located. Thus the beacon pods may create and share location information even without access to GPS satellites. The beacon pods 102 may store location information in memory. In some embodiments, the beacon pods 102 may include accelerometers and/or other hardware that detects movement, which may indicate that the location of a beacon pod may need updating (e.g., due to a possible occurrence of movement of the beacon pod, etc.).

In accordance with one or more embodiments, the beacon pod 102(1), or any other beacon pod or group of beacon pods, may be associated with a boundary 126. The boundary 126 may define usable airspace for use by the UAV, dangerous obstacles, and/or other information. The boundary 126 may extend into the airspace above a location of the beacon pod 102(1). The boundary 126 may be a geofence.

In some embodiments, the beacon pods 102 may exchange data with the UAV 104 after authentication, and possibly using encryption. For example, the beacon pods 102 may employ security measures to prevent unscrupulous activities, such as monitoring data and/or modifying data transmitted to/from the beacon pods 102.

Figure 2:
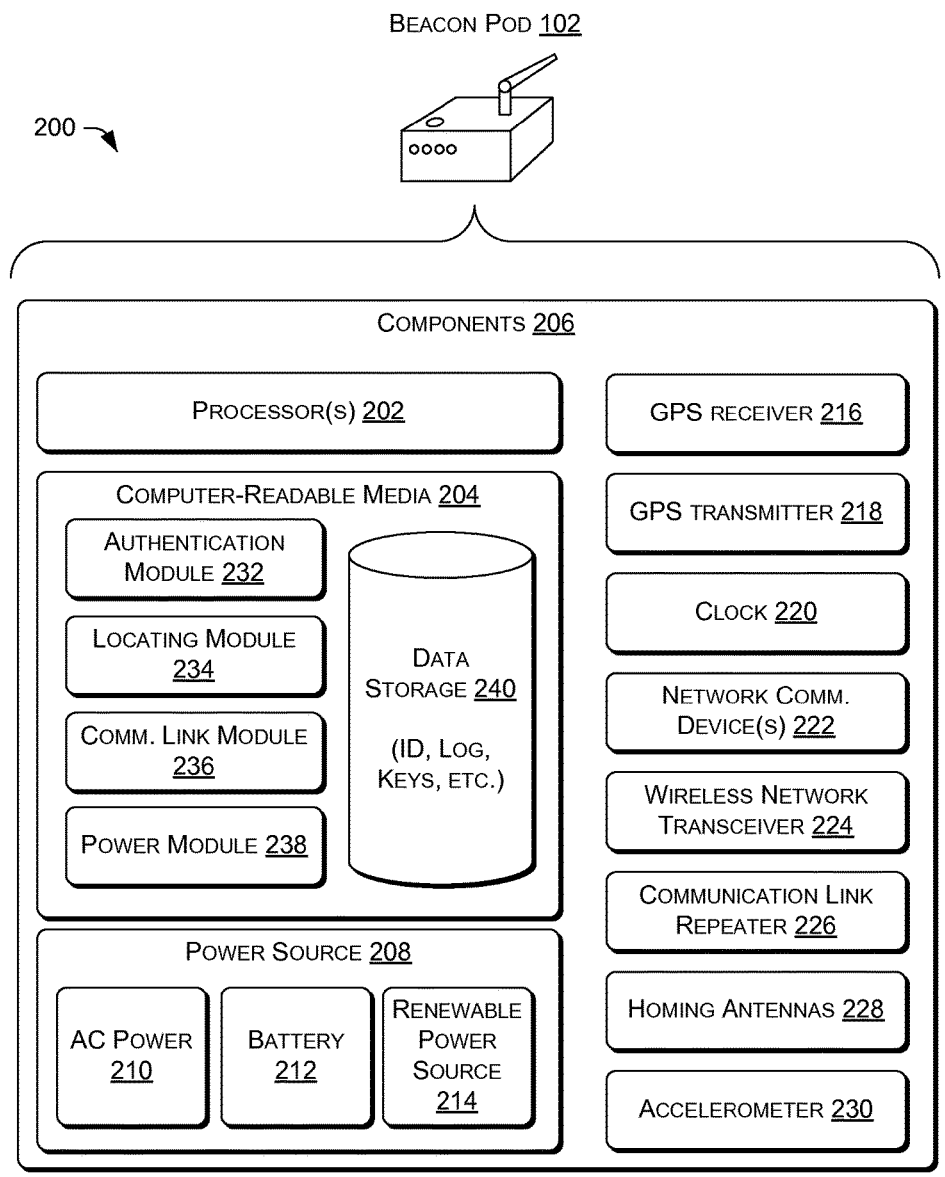
FIG. 2 is a block diagram of an illustrative architecture of a UAV beacon pod.

FIG. 2 is a block diagram of an illustrative architecture 200 of a UAV beacon pod. The architecture 200 may include one or more processors 202 and one or more computer readable media 204 that stores various modules, applications, programs, or other data.

The beacon pod 102 may include some or all of the following components 206, depending on the specific needs at a particular location and/or the resources available at a particular location (e.g., network connectivity, power, etc.). The components 206 may include a power source 208, which may include one or more of alternating current (AC) power 210, a battery 212, and/or a renewable power source 214 (e.g., solar cell, turbine, etc.). In some embodiments, the AC power 210 and/or the renewable power source 214 may charge the battery 212. The components 206 may include a GPS receiver 216, a GPS transmitter 218, and a clock 220, which may be used to receive location information, store the location information for future use, and then broadcast a synthetic GPS signal from the beacon pod 102 to a UAV, where the synthetic GPS signal includes the time and location of the beacon pod. The clock 220 may be updated based on received GPS signals from other devices and/or updated by other systems to ensure that the clock 220 is accurate and minimizes clock drift.

The components 206 may include a network communication device 222 to access a computer network, such as the computer network 120 shown in FIG. 1. For example, the network communication device 222 may be an Ethernet integrated circuit (IC). The components 206 may include a wireless network transceiver 224, which may operate using one or more usable wireless protocols, such as Wi-Fi, Bluetooth®, WiMAX, and/or other wireless protocols. The wireless network transceiver 224 may perform parity checks, such as using a parity signal received from a UAV. The components 206 may include a communication signal repeater/booster 226, which may boost a received signal and/or generate a new signal through connectivity with the computer network.

The components 206 may include homing antennas 228 which may emit signals and/or a pattern (e.g., a dipole flux pattern) to enable a UAV to determine an exact or approximate location of the beacon pod 102 via triangulation, such as using similar processes used by avalanche beacons. The signal may indicate a type or classification of location, such as a dangerous obstacle, a delivery location, a boundary of usable airspace, and/or other locations, boundaries, or areas. The components 206 may include an accelerometer 230 to determine movement of the beacon pod 102, such as to indicate that the beacon pod's location is to be recomputed or verified prior to a subsequent transmission of the location.

Further details about the various hardware are discussed with reference to modules stored on the computer-readable media 204. The computer-readable media 204 may include instructions that, when executed by the one or more processors 202, cause the processors to perform the operations described herein for the beacon pod 102. Embodiments of at least some functionality of the beacon pod 102 may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store an authentication module 232, a locating module 234, a communications link module 236, and a power module 238, which are described in turn. The computer-readable media 204 may include data storage 240, which may be used to store an identifier for the beacon pod 102, an activity log, keys, authentication information, and/or other information.

The authentication module 232 may authenticate a communication with a UAV, such as the UAV 104 shown in FIG. 1. The authentication module 232 may authenticate the UAV based on receipt of expected data, such as data predetermined from the command station 106, possibly provided to the beacon pod 102 via the network connection. The authentication module 232 may authenticate the UAV by an exchange of information (e.g., challenge questions, etc.). The authentication module 232 may also provide an identifier of the beacon pod 102, which may be stored in the data storage 240, to the UAV and receive a UAV identifier. In some embodiments, the authentication module 232 may establish an encryption protocol for exchanging encrypted data with the UAV.

The locating module 234 may determine a location of the beacon pod 102. For example, the locating module 234 may use the GPS receiver 216 to access GPS signals when GPS signals are available from satellites (e.g., on a clear weather day), which may be used (e.g., broadcast) for use by UAVs when communications with satellites (or enough satellites) is not available (e.g., during inclement weather, device failure, etc.). The locating module 234 may determine at least in part by communicating (unidirectionally or bi-directionally) with other beacon pods. The locating module 234 may use triangulation or other similar techniques to determine a location for the beacon pod, including values for latitude, longitude, and/or elevation. The locating module 234 may transmit location information for use by UAVs and/or for authenticated UAVs. The location information may use a same or similar protocol as GPS satellites (interval transmissions of time and location), and/or other transmissions, such as homing transmissions (using the homing antennas), address information (e.g., residential house physical address, etc.), and so forth.

The communications link module 236 may repeat, create, or boost an communication signal, such as by using the communication link repeater 226 and/or by creating a synthetic communication signal through use of connectivity of a computer network via the network communication device 222. In some embodiments, the communications link module 236 may utilize the wireless network transceiver 224 to broadcast network connectivity, which may then facilitate network connectivity by the UAV. The communications link module 236 may enable the UAV to exchange data with the command station 106 via the beacon pod 102.

The power module 238 may manage power modes of the beacon pod. For example, the power module 238 may power the beacon pod on/off and/or switch between various power modes (e.g., low power mode, standby mode, high power mode, etc.), which may be based on communications with a UAV, time of day, availability of power or reserve power, and so forth. For example, the power module 238 may initiate a high power mode once a communication with a UAV has been made by the beacon pod or possibly by a nearby beacon pod, which may trigger the beacon pod to update the power mode. When the beacon pod relies on battery power (e.g., during power outages, from renewable energy sources, etc.), then the power module 238 may regulate power to extend operation of the beacon pod, such as until a next anticipated charging cycle.

FIGS. 3-8 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 3:
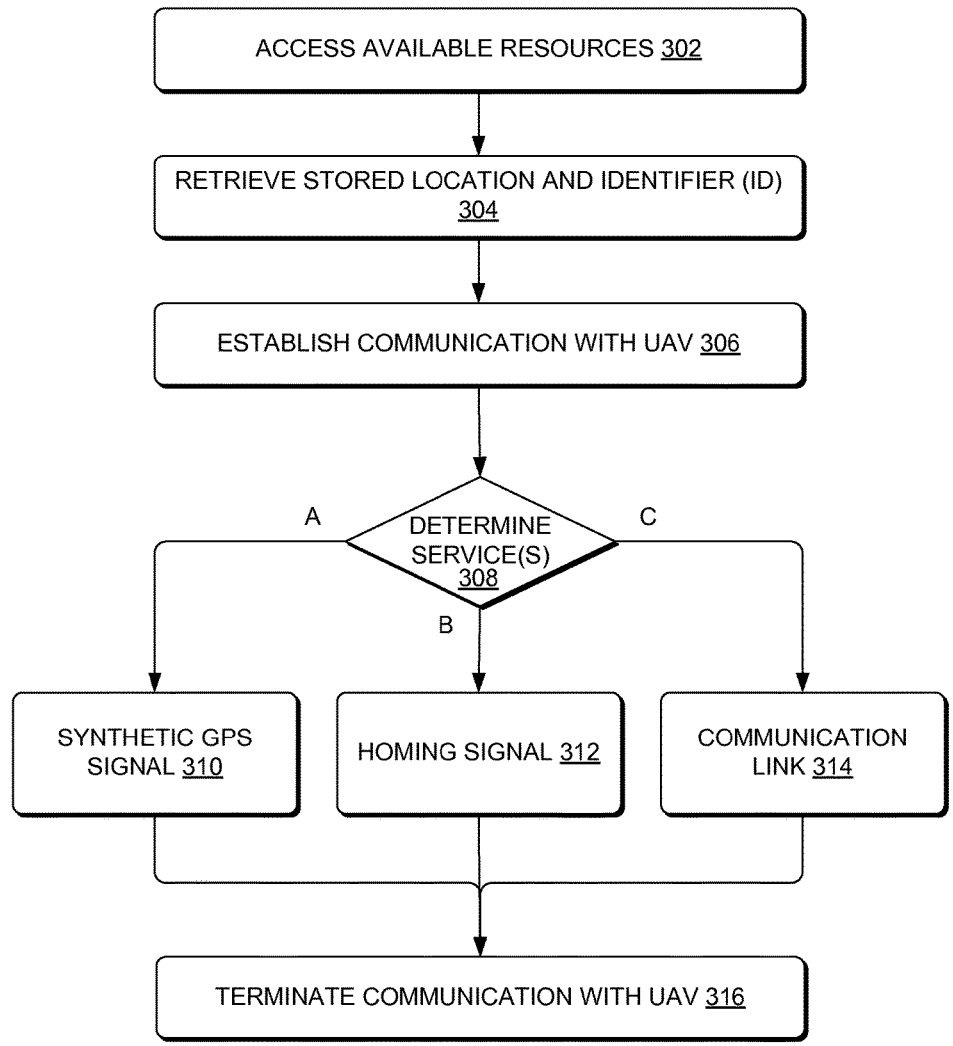
FIG. 3 is a flow diagram of an illustrative process to provide localized navigational and/or communication services to a UAV.

FIG. 3 is a flow diagram of an illustrative process 300 to provide localized navigational and/or communication services to a UAV. The process 300 is described with reference to the environment 100 and the architecture 200. The process 300 shows general functionality possible through use of one or more configurations of the beacon pod 102.

At 302, the beacon pod 102 may access available resources. The available resources may be electrical power resources, network connectivity resources, location information resources, data stored in memory (e.g., the computer readable memory 204 and/or the data storage 240), GPS data from GPS communication resources, and/or other available resources and/or information. For example, the beacon pod 102 may access available resources after being set up by a user at a residential location, such as at the user's home or possibly at other locations.

At 304, the beacon pod 102 may retrieve stored location information and an identifier for the beacon pod. For example, the location information may be pre-programmed for a device (e.g., set for a known location such as a physical residential house address or latitude/longitude). The location information may be determined at least partly by communications with GPS transmitters, including satellites and/or other beacon pods. The location information may be determined at least partly by triangulation from other data sources, such as mobile telephone network antennas. The identifier may be pre-assigned to the beacon pod, and may be stored in the data storage 240. The identifier may uniquely identify the beacon pod, be used for authentication purposes, and/or provide other information, such as a type or classification of a location associated with the beacon pod (e.g., residential address, obstacle marker, airspace boundary, etc.).

At 306, the beacon pod 102 may establish communication with a UAV, such as the UAV 104. The communication may be unidirectional or bi-directional communication depending on the services provided to the UAV.

At 308, the beacon pod 102 may determine services to provide to the UAV. The available services may be predetermined, determined based on authentication of the UAV, and/or determined based on available resources (e.g., from the operation 302). The services may include providing a synthetic GPS signal (at 310, via a route "A"), a homing signal (at 312, via a route "B"), a communication link (at 312, via a route "C"), or any combination thereof (including all three or any two of the three).

At 310, the GPS transceiver may transmit a GPS signal similar to or identical to at GPS signal output by a GPS satellite. The GPS signal may include a time and location of the beacon pod 102. The signal may also include the identifier of the beacon pod and possibly other information (type or classification of location, etc.). Further details about the operation 310 are provided in the discussion of FIG. 4.

At 312, the homing antennas may be used to transmit location information to a UAV. The homing antennas may generate a dipole flux pattern that enables the UAV to locate the beacon pod. The signals may also include the identifier of the beacon pod and possibly other information (type or classification of location, etc.). Further details about the operation 312 are provided in the discussion of FIG. 5.

At 316, the communications link module 236 may use the communication link repeater 226 and/or other hardware (e.g., the network communication device 222, the wireless network transceiver 224) to provide a UAV with data services via a communication link. The communication link may be secured by encryption and/or other protocols via an authentication process performed between the UAV and the beacon pod 102. Further details about the operation 314 are provided in the discussion of FIG. 6.

Following one or more of the operations 310-314, the beacon pod 102 may terminate communication with the UAV. The communication may be terminated by a timeout (e.g., elapse of time or inactivity) or by receipt of a termination signal. The termination may result in a reduction of activity of the beacon pod, a reduction of power used by the beacon pod, and/or other operational changes.

Figure 4:
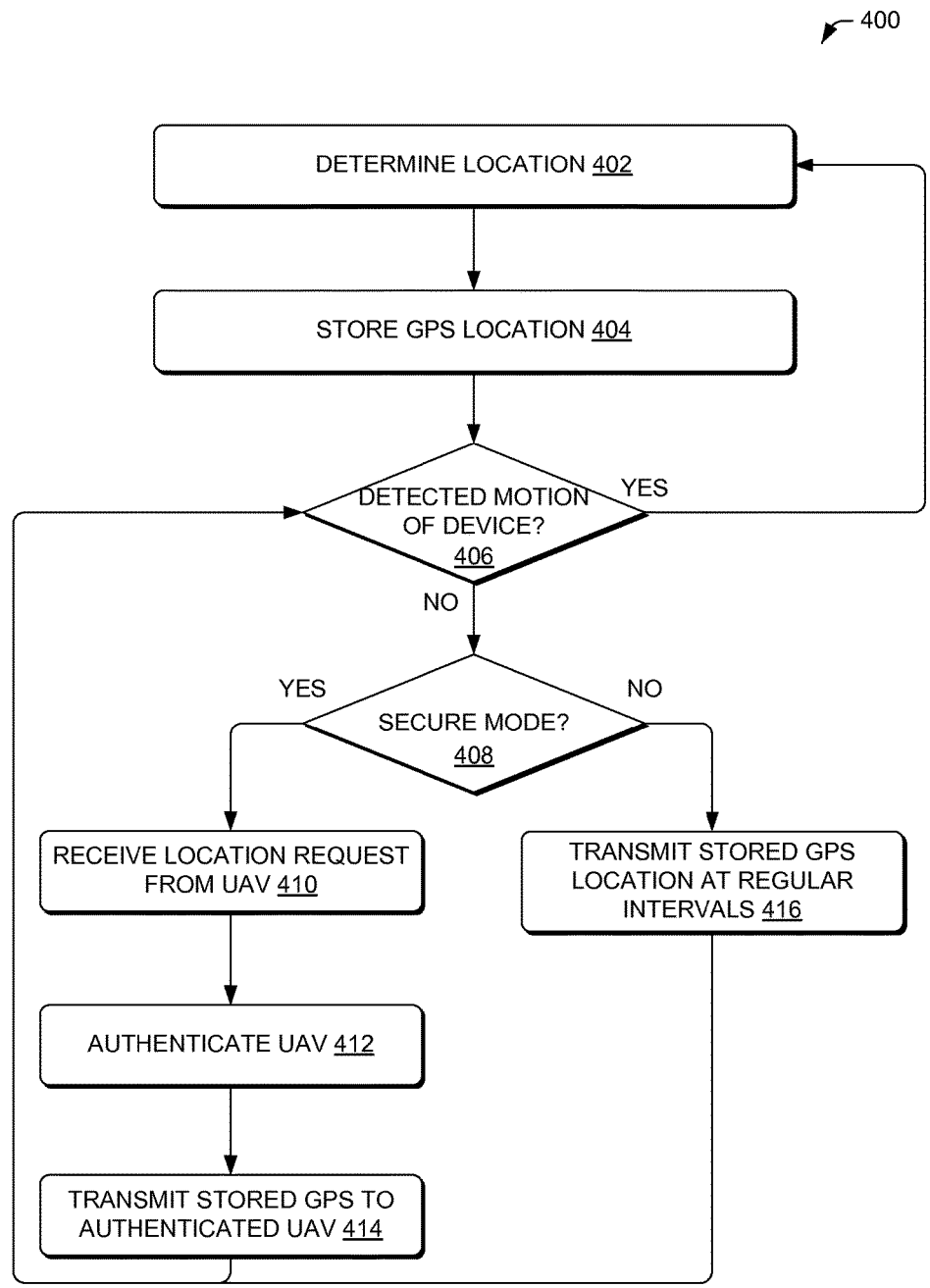
FIG. 4 is a flow diagram of an illustrative process to provide localized positioning information to a UAV.

FIG. 4 is a flow diagram of an illustrative process 400 to provide localized positioning information to a UAV. The process 400 is described with reference to the environment 100 and the architecture 200. The process 400 provides further details of the operation 310 and related operations.

At 402, the beacon pod 102 may determine a location of the beacon pod 102. The location may be determined by accessing GPS location data from GPS satellites and/or other beacon pods. In some instances, the location may be pre-determined (e.g., assigned to the device). The location may be determined by triangulating data from other sources, such as mobile telephone network antennas, beacons, and so forth. The location may be an average or mean value of multiple values obtained over different times or during a specific time period.

At 404, the location information may be stored for future use. For example, the location may be stored as latitude, longitude, and elevation in the data storage 240.

At 406, the beacon pod 102 may determine if movement of the beacon pod occurs. The motion may be detected by the accelerometer 230. Detected motion may invalidate the stored location information or cause the beacon pod 102 to perform the operation 402 again to update the location information. When motion is detected at the decision operation 406 (following the "yes" route from the decision operation 406), then the process 400 may advance to the operation 402. When no motion is detected (following the "no" route from the decision operation 406), then the process 400 may advance to a decision operation 408.

At 408, the beacon pod 102 may determine whether to operate in a secure mode. In the secure mode, the beacon pod 102 may transmit encrypted information or transmit information after successful authentication of a UAV. In a non-secure mode, the beacon pod may freely transmit location information similar to the transmission of most GPS satellites. The determination may be set by the command station 106, by a user, by an administrator, and/or predetermined (set when the device is created or shipped). When the beacon pod 102 determines to transmit in the secure mode (following the "yes" route from the decision operation 408), then the process 400 may continue to an operation 410.

At 410, the beacon may receive a request for location information from a UAV. For example, the request may be a detection of the UAV or a notification from the command station 106 about presence of a UAV in an area associated with the beacon pod.

At 412, the beacon pod 102 may authenticate the UAV via the authentication module 232. The authentication may initiate encryption for use in transmitting information to the UAV. However, the secure mode may not use encryption in some instances, but instead rely on an identification of the UAV (e.g., approved UAV, etc.).

At 414, the beacon pod 102 may transmit location information, such as latitude, longitude, and a time to the UAV. The location information may be provided in intervals. In some embodiments, the location information may take other forms that are understood by the UAV. The location information may include an identifier of the beacon pod and/or other information about the location, such as a location type or classification (e.g., residence, obstacle, airspace boundary, etc.). The transmitting may be terminated after a timeout, after a signal received from the UAV or command station 106, or in response to other events. Following the operation 414, the process 400 may continue to the operation 406. The beacon pod 102 may perform a parity check, such as by receipt of a signal from a receiving device (e.g., a UAV, etc.) that is received in response to the transmitting of the location information.

When the beacon pod 102 determines to not transmit in the secure mode (following the "no" route from the decision operation 408), then the process 400 may continue to an operation 416. At 416, the beacon pod 102 may transmit location information, such as latitude, longitude, and a time to the UAV. The location information may be provided in intervals. In some embodiments, the location information may take other forms that are understood by UAVs. The location information may include an identifier of the beacon pod and/or other information about the location, such as a location type or classification (e.g., residence, obstacle, airspace boundary, etc.). The location information provided via the operation 416 may be understandable and usable by any device configured to receive location signals, such as GPS signals. The beacon pod 102 may perform a parity check, such as by receipt of a signal from a receiving device that is received in response to the transmitting of the location information. Following the operation 416, the process 400 may continue to the operation 406.

In some embodiments, the beacon pod 102 (and other beacon pods) may provide GPS signals that enable improved location accuracy. Some existing systems used to improve accuracy include Wide Area Augmentation System (WAAS), European Geostationary Navigation Overlay Service (EGNOS), Differential GPS (DEPS), Inertial Navigation Systems (INS), and Assisted GPS. Standard accuracy of locations determined by GPS of about 49 feet can be augmented to 10-16 ft. with DGPS, and to about 10 ft. with WAAS. Use of the beacon pod 102 may further improve accuracy, such as by reducing clock drift and proving GPS signals at a power level that enables UAVs to receive the signals at higher power levels than signals originating from GPS satellites.

Figure 5:
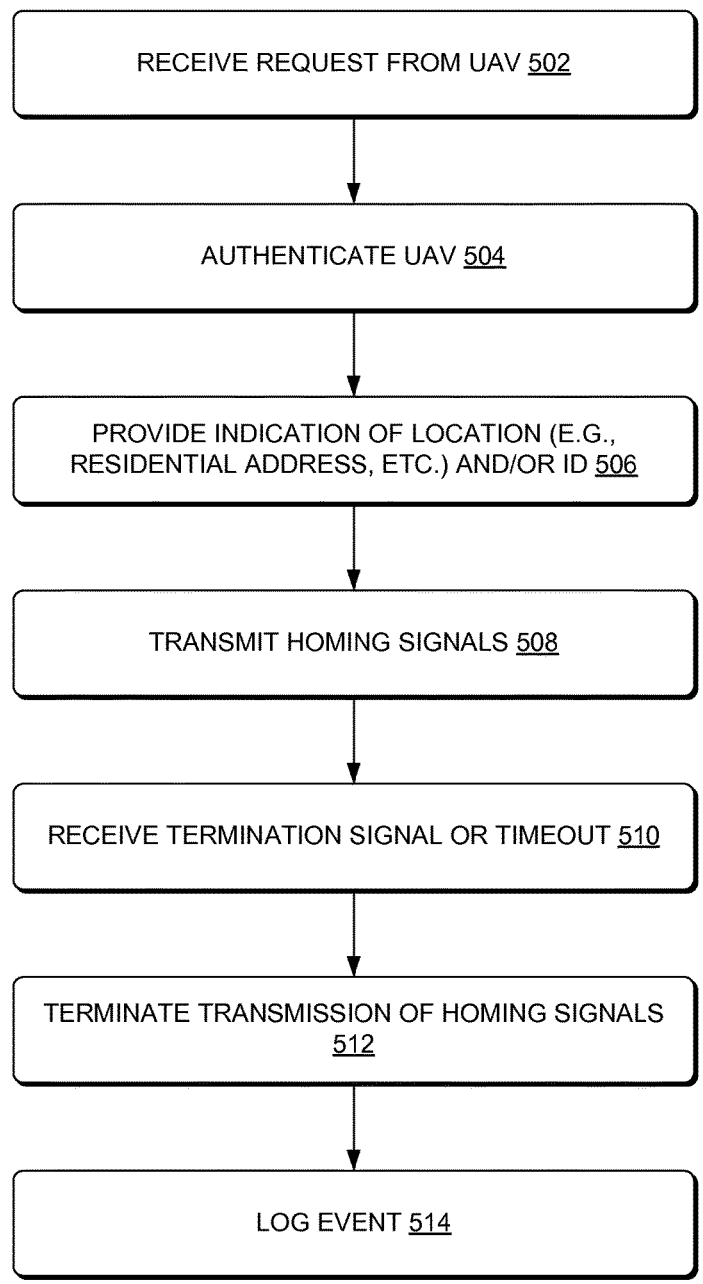
FIG. 5 is a flow diagram of an illustrative process to provide homing information to a UAV.

FIG. 5 is a flow diagram of an illustrative process 500 to provide homing information to a UAV. The process 500 is described with reference to the environment 100 and the architecture 200. The process 500 provides further details of the operation 312 and related operations.

At 502, the beacon pod 102 may receive a request to transmit a homing signal. The request may be received from a UAV, from the command station 106, and/or from another beacon or other source.

At 504, the beacon pod 102 may authenticate the UAV via the authentication module 232. The authentication may initiate encryption for use in transmitting information to the UAV. However, the beacon pod may not use encryption in some instances, but instead rely on an identification of the UAV (e.g., approved UAV, etc.). In some embodiments, the operations 502 and/or 504 may be bypassed.

At 506, the beacon pod 102 may provide an indication of the location. The indication may be a type or classification of location, such as a residence, an office, a marker, an obstacle to avoid, a delivery destination, a border/boundary of usable airspace, and so forth. The beacon pod 102 may also provide an identifier (ID) associated with the beacon pod 102. The identifier may provide the type or classification of a location, directly, via a lookup table, or via other references.

At 508, the beacon pod 102 may transmit (e.g., broadcast) homing signals. In some embodiments, the homing signals may be transmitted via the homing antennas 228, such as by a dipole flux pattern which can be deciphered by the UAV to determine location and distance information associated with the beacon pod 102. Other homing signal processing may be used, such as acoustic homing using human-audible frequencies or human-non-audible frequencies.

At 510, the beacon pod 102 may receive a signal to terminate the homing signals and/or may timeout. For example, the termination signal may be received from the UAV, from the command station 106, or from another beacon pod or other source. The timeout may occur after a predetermined amount of time or inactivity (e.g., inactivity of communications from the UAV or another source).

At 512, the beacon pod may terminate the transmission of the homing signals. In some embodiments, such as when the beacon pod marks a location of an obstacle to be avoided (e.g., a tall structure or bridge, a cliff, an airspace boundary, etc.), the homing signal may not be terminated.

At 514, the beacon pod 102 may log an event associated with the use of the homing signal. For example, the beacon pod 102 may log an identifier of the UAV, a time, and a reason for the homing (e.g., package delivered, waypoint achieved, etc.). The logged event may be stored in the data storage 240, transmitted to the command station 106, and/or used for other purposes.

Figure 6:
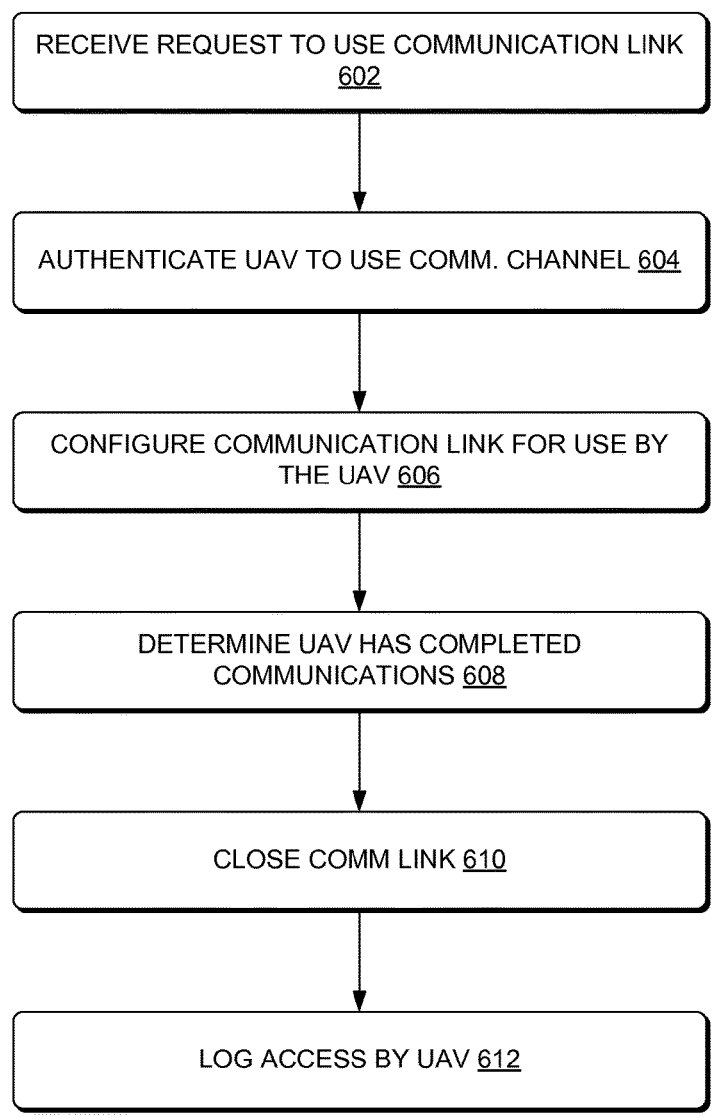
FIG. 6 is a flow diagram of an illustrative process to provide localized communication services to a UAV.

FIG. 6 is a flow diagram of an illustrative process 600 to provide localized communication services to a UAV. The process 600 is described with reference to the environment 100 and the architecture 200. The process 600 provides further details of the operation 314 and related operations.

At 602, the beacon pod 102 may receive a request to enable use by a UAV of a communication link that provides access to a data network via the beacon pod. The communication link may be provided as a boosted or repeated communication signal, a Wi-Fi access point, and/or other transmission providing data connectivity by the UAV to another source via the beacon pod 102. The request may be received from a UAV, from the command station 106, and/or from another beacon or other source.

At 604, the beacon pod 102 may authenticate the UAV via the authentication module 232. The authentication may initiate encryption for use in transmitting information to the UAV. However, the beacon pod may not use encryption in some instances, but instead rely on an identification of the UAV (e.g., approved UAV, etc.). In some embodiments, the operations 602 and/or 604 may be bypassed.

At 606, the beacon pod 102 may configure a communication link for use by the UAV. For example, the beacon pod 102 may begin transmitting signals to facilitate the exchange of data with the UAV, may boost a current signal, may create a signal using network data that enables signal replication of a communication signal via a computer network, and/or by other known techniques.

At 608, the beacon pod 102 may determine that the UAV has completed use of the communication link or that a timeout has occurred. For example, a termination signal may be received from the UAV, from the command station 106, or from another beacon pod or other source. The timeout may occur after a predetermined amount of time or inactivity (e.g., inactivity of communications from the UAV or another source).

At 610, the beacon pod 102 may close the communication link. For example, the beacon pod 102 may power down or terminate use of the communication link repeater 226, power down or terminate use of the wireless network transceiver 224, and so forth.

At 612, the beacon pod may log an event associated with the use of the communication link. For example, the beacon pod 102 may log an identifier of the UAV, a time, and a reason for use of the communication link (e.g., package delivered, waypoint achieved, distress signal, etc.). The logged event may be stored in the data storage 240, transmitted to the command station 106, and/or used for other purposes.

Figure 7:
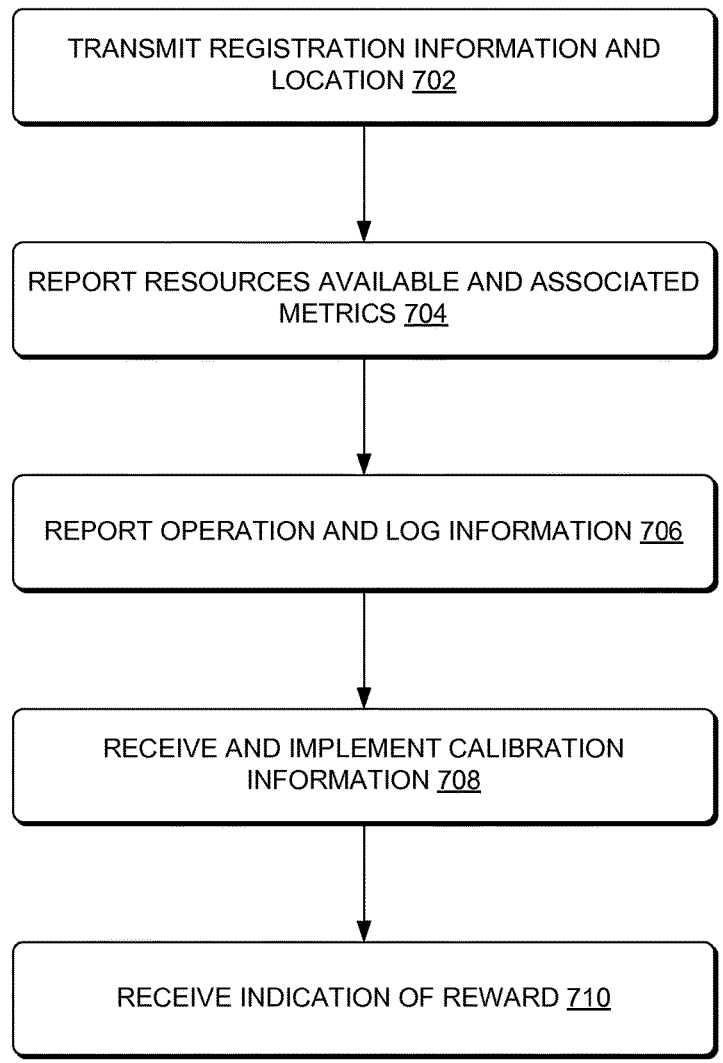
FIG. 7 is a flow diagram of an illustrative process to exchange information with a command station.

FIG. 7 is a flow diagram of an illustrative process 700 to exchange information with a command station. The process 700 is described with reference to the environment 100 and the architecture 200. The process 700 may operate along with the processes described above to enable the beacon pod 102 to report information to the command station 106 or to other systems.

At 702, the beacon pod 102 may transmit registration information to the command station 106. For example, the authentication module 232 may transmit information to the command station 106 after the beacon pod is powered on and set up in a new location. The registration information may include at least a unique identifier of the beacon pod and a determined location of the beacon pod. The command station 106 may then rely on operation of the beacon pod 102, which may be used to provide navigational information to UAVs deployed or controlled by the command station 106.

At 704, the beacon pod may report resources available and metrics for those resources. For example, the beacon pod may report communication signal availability and strength, Wi-Fi signal availability and strength, GPS signal availability and strength, etc. This information may be used by the command station 106 to determine operation of the beacon pod 102 and to determine additional needs for other beacon pods in a region, for example. In some embodiments, this information may be used to modify use of the beacon pod (e.g., determine functionality to be used by the beacon pod, etc.), recall the beacon pod (e.g., have a user send it back), and/or make other modifications if the operation of the beacon pod is not sufficient for the beacon pod's intended purpose and/or for other reasons. For example, if the beacon pod is located by a user in a cement basement of a home, the beacon pod may experience poor reception. In this example situation, the command station 106 may request the user to move the beacon pod to a different location in the home that has better reception. The command station 106 may determine the beacon pod has relatively poor performance based on comparing the reported resources from the operation 704 with expected values and/or values of other beacon pods nearby (e.g., used for benchmarked data).

At 706, the beacon pod 102 may report operation and log information 706. For example, the beacon pod 102 may transmit information to the command station 106 that indicates operation of the beacon pod 102 (e.g., what operations are performed by the beacon pod 102, etc.), log information (e.g., the logged event from the operations 514 and 612, etc.). For example, the beacon pod may store a log of interaction with UAVs, which may include a time and location of the UAV as well as other information, such as distress calls, functionality reports, and so forth. Thus, the beacon pod 102 may operate similar to a black box used by commercial aircraft to report and log flight data that may be helpful for various reasons, such as to investigate an incident involving a UAV.

At 708, the beacon pod 102 may receive and implement calibration information. The calibration information may adjust a power of an outputted transmission by the beacon pod 102 so that an outputted signal is available over a predetermined area or space. For example, the beacon's power may be increased or decreased to extend or decrease a range of signals output from the beacon pod 102. In some embodiments, a UAV flying over near the beacon pod may assess a range of the signals transmitted by the beacon pod, and thus provide information as to a calibration. Other beacon pods may also be used in the calibration of each other (determine that signal strength from a neighboring beacon pod is appropriate, too low, too high, etc.). The beacon pod 102 may receive the calibration information from any one or more of the command station 106, a UAV, and/or another beacon pod, among other possible sources.

At 710, the beacon pod 102 may receive an indication of a reward from the command station 106. The reward may be granted to a person or entity associated with the beacon pod 102, such as an owner of the residence where the beacon pod is located. The reward may be a discount in shipping costs to the location (e.g., such as shipping by the UAV, etc.) and/or other rewards such as discounted connectivity services (e.g., computer network connectivity, power connectivity, etc.). Thus, a person or entity that cares for the beacon pod and provides power and connectivity for the beacon pod 102 may receive a reward or other compensation, including credits, money, coupons, and so forth.

Figure 8:
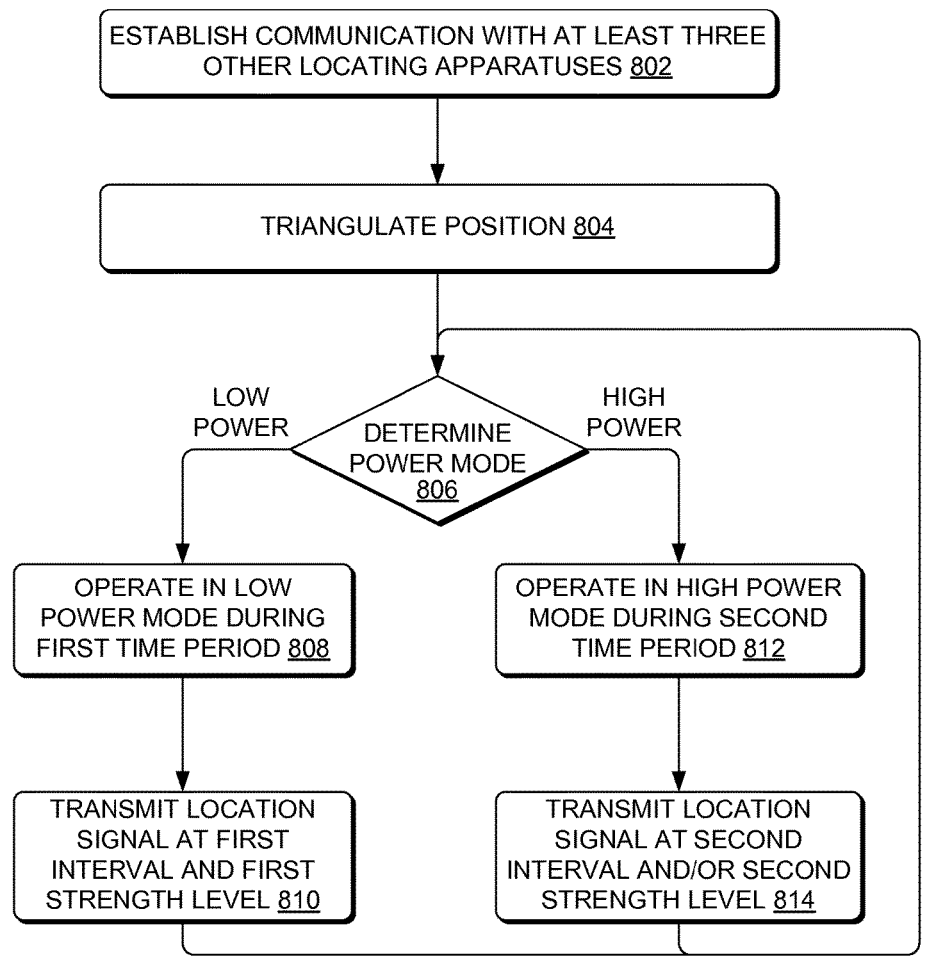
FIG. 8 is a flow diagram of an illustrative process to expand an ad hoc location network by self-identifying a location, selecting a power mode, and transmitting location signals.

FIG. 8 is a flow diagram of an illustrative process 800 to expand an ad hoc location network by self-identifying a location, selecting a power mode, and transmitting location signals. The process 800 is described with reference to the environment 100 and the architecture 200. The process 800 includes communication between the beacon pod 102 and other beacon pods, which may be in operation prior to the beacon pod 102 and include known locations.

At 802, the beacon pod 102 may establish a communication with at least other locating devices to determine a location of the beacon pod 102. In some instances, the at least three other location devices may all be other beacon pods. However, locating devices may also be satellites, UAVs, antennas, and/or other locating devices.

At 804, the beacon pod 102 may triangulate a location of the beacon pod 102. The beacon pod 102 may then store this location for future use.

At 806, the beacon pod 102, using the power module 238, may determine a power mode for operation. The power mode may enable the beacon pod 102 to conserve energy to extend usage of the beacon pod 102 (e.g., when running on battery power or reliant on renewable energy sources such as wind power or solar power, etc.), or to reduce costs incurred by a person or entity that houses and operates the beacon pod 102 (e.g., reduce power drain during off-peak UAV flight times, etc.). In some embodiments, the power mode may be determined by an availability of GPS signals or other communication signals from other sources. For example, if the beacon pod can receive GPS signals, it may not rebroadcast GPS signals (thereby conserving power) or may minimize broadcast (e.g., using a low power mode) until the beacon pod becomes unable to receive GPS signals from other sources such as satellites. At that point, the beacon pod may transmit its own GPS signals, at least temporarily, such as using a high power mode. Thus, the beacon pod may only operate when it is most needed by UAVs or other GPS devices. When the power module 238 determines to cause operation in a low power mode (following the "low power" route from the decision operation 806), then the process 800 may advance to an operation 808.

At 808, the beacon pod 102 may operate in a low power mode during a first time period. The first time period may be predetermined by another device such as the command station 106 (e.g., during non-peak UAV flight times, etc.), or may be determined by the beacon pod 102 based on usage and UAV activity. For example, after a passage of time, the beacon pod 102 may enter the low power state when not communicating with any UAVs. In some embodiments, the low power mode may be implemented in part by using low power antennas to transmit and/or receive signals.

At 810, the beacon pod 102 may transmit a location signal at a first interval and/or a first strength level. The first interval may be less than a second interval. The first strength level may be less than a second strength. Following the operation 810, the process 800 may return to the decision operation 806, or possibly the operation 802.

When the power module 238 determines to cause operation in a high power mode (following the "high power" route from the decision operation 806), then the process 800 may advance to an operation 812. At 812, the beacon pod 102 may operate in a high power mode during a second time period. The second time period may be predetermined by another device such as the command station 106 (e.g., during heavy traffic UAV flight times, etc.), or may be determined by the beacon pod 102 based on usage and UAV activity. In some embodiments, the high power mode may be implemented in part by using high power antennas to transmit and/or receive signals.

At 814, the beacon pod 102 may transmit a location signal at a second interval and/or a second strength level. Following the operation 814, the process 800 may return to the decision operation 806, or possibly the operation 802.

In an example operation, the power module 238 may cause the interval of location data transmissions to be less frequent in the operation 810 as compared to the interval frequency at the operation 814, while using a same or similar strength level at the operations 810 and 814. This may reduce power consumption of the beacon pod 102.

In another example operation, the power module 238 may cause the power level of signals transmitted at the operation 810 to be of lower power than signals transmitted at the operation 814, while the power module 238 may cause the interval of location data transmissions at the operation 810 and the operation 814 to be the same or similar. This may also reduce power consumption of the beacon pod 102.

In yet another example operation, the power module 238 may cause the interval of location data transmissions to be less frequent in the operation 810 as compared to the interval frequency at the operation 814 and the power module 238 may cause the power level of signals transmitted at the operation 810 to be of lower power than signals transmitted at the operation 814. This may further reduce power consumption of the beacon pod 102. Power consumption control may be particularly relevant for non-building uses of the beacon pod 102, such as shown in FIG. 1 via the beacon pod 102(1) that includes the renewable power source 122.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A beacon pod to provide navigational information to a unmanned aerial vehicle (UAV), the beacon pod comprising:
a global positioning system (GPS) receiver to determine, at a first time, a latitude and longitude of a location that is associated with the beacon pod;
memory to store at least:
the determined latitude and longitude to be transmitted to the UAV at a second time,
a unique identifier of the beacon pod, the unique identifier further indicating a classification of the location that is associated with the beacon pod, and
an authentication protocol to enable authentication of the UAV;
a transceiver to receive authentication information from the UAV;

a processor to execute the authentication protocol to authenticate the UAV based at least in part on the authentication information; and a location information transmitter to emit location signals to the UAV, the location signals including at least the unique identifier, a current time, and the determined latitude and longitude of the location associated with the beacon pod.

2. The beacon pod as recited in claim 1, further comprising:

a network communication device to establish communications with a command station, the command station to control at least some operations of the UAV, wherein the transceiver further establishes communications between the UAV and the command station via the network communication device based at least in part on the authenticating the UAV, the communications including instructions provided by the command station to the UAV.

3. The beacon pod as recited in claim 1, further comprising:

homing antennas to transmit homing signals to the UAV, the homing signals including a dipole flux pattern that enables the UAV to determine an approximate location and distance between the UAV and the beacon pod.

4. The beacon pod as recited in claim 1, wherein the classification of the location includes a designation as at least one of a physical residence, an obstacle to avoid, a delivery destination, or a boundary associated with usable airspace for the UAV.

5. The beacon pod as recited in claim 1, wherein the GPS transmitter and the GPS receiver are part of a GPS transceiver assembly.

6. An apparatus comprising:

memory to store at least (i) a latitude and longitude associated with a location of the apparatus, (ii) a unique identifier associated with the apparatus, and (iii) a location classification that describes the location; and a transceiver to emit location signals to an unmanned aerial vehicle (UAV) and receive a parity signal to confirm receipt of the location signals, the location signals including at least the unique identifier, the location classification, a current time, and the latitude and longitude associated with the location of the apparatus.

7. The apparatus as recited in claim 6, wherein the memory further stores an event log, and wherein the transceiver is further configured to receive a UAV identifier from the UAV, the event log to store the UAV identifier and a time associated with receipt of the UAV identifier.

8. The apparatus as recited in claim 6, further comprising one or more antennas to transmit homing signals to the UAV, the homing signals including a pattern that enables the UAV to determine a location and distance between the UAV and the apparatus.

9. The apparatus as recited in claim 6, wherein the memory further comprises an authentication protocol to enable authentication of the UAV, and wherein the transceiver receives authentication information from the UAV, the apparatus further comprising:

a processor to (i) execute the authentication protocol via the transceiver to authenticate the UAV based at least in part on the authentication information and (ii) encrypt at least a portion of the location signals.

10. The apparatus as recited in claim 6, further comprising:

a network communication device to establish communications with a command station, the command station configured to control at least some operations of the UAV, and wherein the transceiver establishes communications between the UAV and the command station via the network communication device, the communications including instructions provided by the command station to the UAV.

11. The apparatus as recited in claim 10, wherein the transceiver is a Wi-Fi transceiver or a WiMAX transceiver.

12. The apparatus as recited in claim 6, further comprising a renewable energy source to provide power to at least the transceiver, the renewable energy source including at least one of solar cells or a turbine.

13. The apparatus as recited in claim 6, further comprising an accelerometer to determine movement of the apparatus.

14. A system, comprising:

an unmanned aerial vehicle (UAV); and a plurality of beacon pods to transmit at least location information to the UAV, a beacon pod of the plurality of the beacon pods including:

memory to store at least a (i) latitude and longitude for a location associated with the beacon pod to be transmitted to the UAV and (ii) a unique identifier of the beacon pod, the unique identifier further indicating a classification of the location that is associated with the beacon pod, and a global positioning system (GPS) transmitter to emit location signals to the UAV, the location signals including at least the unique identifier, a current time, and the latitude and longitude of the location associated with the at least one beacon pod, wherein the UAV is configured to navigate, at least partly, by triangulating its position using the location signals received from the at least one beacon pod of the plurality of beacon pods.

15. The system as recited in claim 14, wherein the memory further comprises an authentication protocol to enable authentication of the UAV by the beacon pod; the system further comprising:

a transceiver to receive authentication information from the UAV; and a processor to execute the authentication protocol to authenticate the UAV based at least in part on the authentication information, wherein the GPS transmitter transmits the GPS signals after authenticating the UAV.

16. The system as recited in claim 14, further comprising a command station to provide instructions to the UAV, wherein the beacon pod further includes:

a network communication device to enable the beacon pod to exchange data with the command station; and a transceiver to enable the beacon pod to exchange data with the UAV, wherein the beacon pod is configured to facilitate data exchange between the command station and the UAV using the network communication device and the transceiver.

17. The system as recited in claim 16, wherein the command station determines a reward to be issued to a user associated with the location of the beacon pod, the reward provided to the user in response to operation of the beacon pod.

18. The system as recited in claim 14, wherein the beacon pod further includes one or more homing antennas configured to transmit homing signals to the UAV, the homing signals including a pattern that enables the UAV to determine a location and distance between the UAV and the beacon pod.

19. The system as recited in claim 14, wherein each of the plurality of beacon pods include a transceiver configured to receive a UAV identifier from the UAV, and wherein the memory further stores an event log to store at least the UAV identifier and a time associated with receipt of the UAV identifier, the transceiver further configured to transmit the event log to a command station.

20. The system as recited in claim 14, wherein the UAV provides signals, directly or indirectly, to the beacon pod to calibrate a signal strength associated with the beacon pod.

* * * * *